(12) United States Patent
DeFrank et al.

(10) Patent No.: US 9,027,856 B2
(45) Date of Patent: May 12, 2015

(54) APPARATUS AND METHOD OF MANUFACTURING PRESSURE COMPENSATOR TYPE DRIP IRRIGATION TUBES WITH DESIRED MOLECULAR ORIENTATION AND TUBES OBTAINED THEREBY

(75) Inventors: Michael P. DeFrank, Madera, CA (US); Mark D. Wynn, Caruthers, CA (US)

(73) Assignee: Jain Irrigation Systems, Ltd., Jalgaon, Maharashtra (IN)

( * ) Notice: Subject to any disclaimer, the term of this patent is extended or adjusted under 35 U.S.C. 154(b) by 609 days.

(21) Appl. No.: 13/342,549

(22) Filed: Jan. 3, 2012

(65) Prior Publication Data
US 2012/0217324 A1 Aug. 30, 2012

(30) Foreign Application Priority Data
Jan. 4, 2011 (IN) .............................. 21/MUM/2011

(51) Int. Cl.
| | |
|---|---|
| B05B 15/00 | (2006.01) |
| B29D 23/18 | (2006.01) |
| A01G 25/02 | (2006.01) |
| B29C 65/00 | (2006.01) |
| B29C 47/00 | (2006.01) |
| B29C 47/02 | (2006.01) |
| B29C 47/06 | (2006.01) |
| B29C 55/28 | (2006.01) |
| B29C 65/02 | (2006.01) |
| B29C 65/48 | (2006.01) |
| B29C 47/20 | (2006.01) |
| B29C 53/48 | (2006.01) |
| B29C 65/52 | (2006.01) |

(52) U.S. Cl.
CPC .............. *B29D 23/18* (2013.01); *A01G 25/026* (2013.01); *B29C 66/1122* (2013.01); *B29C 66/4322* (2013.01); *B29C 47/0026* (2013.01); *B29C 47/0057* (2013.01); *B29C 47/0059* (2013.01); *B29C 47/0064* (2013.01); *B29C 47/0069* (2013.01); *B29C 47/025* (2013.01); *B29C 47/065* (2013.01); *B29C 66/73921* (2013.01); *B29C 47/20* (2013.01); *B29C 53/48* (2013.01); *B29C 55/28* (2013.01); *B29C 65/02* (2013.01); *B29C 65/028* (2013.01); *B29C 65/525* (2013.01); *B29C 65/4815* (2013.01)

(58) Field of Classification Search
CPC .............................. A01G 25/023; A01G 25/06
USPC ............ 239/11, 542, 547; 156/227, 218, 203, 156/204
See application file for complete search history.

(56) References Cited

U.S. PATENT DOCUMENTS

| | | | | | |
|---|---|---|---|---|---|
| 4,210,287 | A | * | 7/1980 | Mehoudar | 239/542 |
| 4,247,051 | A | * | 1/1981 | Allport | 239/542 |
| 4,722,759 | A | * | 2/1988 | Roberts et al. | 156/203 |
| 4,874,132 | A | * | 10/1989 | Gilead | 239/542 |
| 5,318,657 | A | * | 6/1994 | Roberts | 156/466 |

* cited by examiner

*Primary Examiner* — Davis Hwu
(74) *Attorney, Agent, or Firm* — Burns & Levinson LLP; Orlando Lopez (57) ABSTRACT

A method for manufacturing high speed pressure compensator-type drip irrigation tubes and the tubes obtained thereby having absolute radial orientation of molecular chains, the orientation imparting strength as well as flexibility to the tube material. The said method comprises extruding a tube using a plurality of extruders; blowing up the extruded tube by introducing a pressure inside the tube relatively higher than the pressure outside the tube; drawing the blown tube simultaneously to the blowing of tube; flattening the blown tube by heat welding the collapsed halves together and forming a tape immediately, subsequent to the process of blowing and drawing the tube; extrusion of a bonding polymer on one border of the tape; printing flow channels into the hot and viscous bonding polymer; and forming a tube by lengthwise folding the tape and heat welding the overlapping borders together using the bonding polymer.

12 Claims, 12 Drawing Sheets

APPARATUS AND METHOD OF MANUFACTURING PRESSURE COMPENSATOR TYPE DRIP IRRIGATION TUBES WITH DESIRED MOLECULAR ORIENTATION AND TUBES OBTAINED THEREBY

CROSS-REFERENCE TO RELATED APPLICATIONS

This application claims priority to co-pending Indian Patent Application No. 21/MUM/2011 filed Jan. 4, 2011, which is incorporated by reference herein in its entirety for all purposes.

FIELD OF INVENTION

The invention relates to a production line for manufacturing pressure compensator-type drip irrigation tubes, an associated method of manufacturing pressure compensator-type drip irrigation tubes using the production line, and the pressure compensator-type drip irrigation tubes obtained by such method. Particularly, the invention relates to a method and an apparatus for high speed production of pressure compensator-type drip irrigation tubes having absolute radial orientation of molecular chains.

More particularly, it relates to method and apparatus for high speed production of thin walled pressure compensator-type drip irrigation tubes having absolute radial orientation of molecular chains, the orientation imparting strength as well as flexibility to the tube material.

BACKGROUND

In the presently known methods of manufacturing plastic materials, it is a well-known fact that the mechanical properties of polymers change substantially when the molecular chains (threadlike molecules) from which they are composed of, are not left in their natural chaotic (convoluted) arrangement, but are orientated. Generally, the orientation results in enhancement in strength of the articles in a given direction by orienting the molecules in the plastic material in respective direction. Usually, biaxial orientation of the plastic materials is preferred in order to improve the mechanical properties through molecular orientation of the thermoplastic material in two mutually perpendicular directions—the axial direction and the circumferential or radial direction.

In case of plastic pipes, the molecular orientation is conferred in the circumferential direction (radial orientation) in order to increase the pressure resistance of the plastic pipe; and in the longitudinal direction (axial orientation) in order to increase the tensile strength of the pipe. More specifically, the orientation in the radial direction provides a high admissible stress at yield (i.e. high elastic limit). The higher the admissible stress at yield, the lower the thickness of the tube wall required to resist a given internal pressure. Similarly, when the molecular orientation is in axial direction, the stress at yield is much higher in axial direction but also the admissible elongation before break (strain) is much lower. However, due to possible incidents during manipulation of the irrigation tube, the elongation before break (strain) must be as high as possible.

Whereas no specific requirement has been realized for the high stress at yield in axial direction of the tube. Therefore, it is highly desired that the tubes are oriented absolutely in radial direction with minimal or no axial orientation in order to produce a tube with high stress at yield in radial direction (to withstand high internal pressure) and high elongation before break (to withstand longitudinal stress during the tube manufacture). Such tubes have high utility in the drip irrigation systems. However, with the presently available set of machines used for the production of irrigation tubes, it is not possible to achieve the desired composition of molecular orientation and/or thickness of tube wall in the final manufactured tubes while still maintaining the desired high speed of production.

Among several known methods and apparatuses available in the prior art for manufacturing of oriented plastic materials, the blown-film technique is most commonly used for manufacturing plastic films having a combinations of radial and axial orientation. In the blown-film technique, the molten polymer from the extruder head enters the die, where it flows round a mandrel and emerges through a ring-shaped opening in the form of a tube. The tube is expanded into a bubble of required diameter by the pressure of internal air admitted through the center of the mandrel. The air contained in the bubble acts like a permanent shaping mandrel.

This way, the molecular orientation is obtained in the film in hoop direction (radial orientation) during blowup; and additional orientation in the direction of flow (longitudinal orientation) can be induced by tension from the rollers located downstream. The film bubble moves forward through guiding devices into a set of pinch rolls which flatten it. However, the blown film technique is generally employed for manufacturing the tapes and films; it is not practiced for manufacturing long tubes or pipes.

The methods and apparatuses presently used in industry for manufacturing irrigation tubes are based on pipe/tube extrusion methods and/or variations thereof. In these methods, the die used for the extrusion of pipe or tubing comprises a die body with a tapered mandrel and an outer die ring which control the dimensions of the inner and outer diameters of the tube, respectively. Typically this die plate (having an orifice of appropriate geometry), placed on the face of the die assembly is called the 'Calibrator' which constitutes an indispensable part of the presently used tube-extrusion machines. While passing through the calibrator, the molten polymer is subjected to high surface drag, resulting in high friction and reduced flow through the thinner sections of the orifice. Thus the calibrator in the production line, although essential for determining the tube parameters, acts as a limitation factor for the production speed. The surface drag results in a reduced rate of production of the irrigation tube, especially in case of production of tubes with low diameter. Although this effect can be countered by altering the shape of the orifice, but this often results in a wide difference in the orifice shape from the desired extrusion profile. Therefore, this problem of reduced flow is presently countered in the industry by the use of vacuum suctions immediately downstream of the calibrator. This vacuum suction, although increases the speed of passage of the extruded tape, further increases the friction and thus the extruded tube is subjected to high longitudinal stretch and the axial expansion. This inadvertently results in undesired excessive axial orientation of the molecular chains in the final produced tubes. Thus the calibrator, although an extremely essential component for the presently used machines, acts as an impediment to the speed of production and any effort made thereby to increase the speed of production would tend to compromise the mechanical properties of the tube by exerting unnecessary longitudinal stretching (axial orientation) to the formed tube. Although an already oriented tube can be further subjected to a stabilizing process which includes reheating and inflating the tube to a pre-established diameter and subsequently cooling it in a cooling chamber containing a calibrating device capable of determining the finished diameter of the tube, but that would be a much lengthy process and certainly not cost effective. Therefore, the presently used tube-extrusion methods do not take into account the excessive axial orientation occurred during the production process and are thus not appropriate for conferring desired molecular orientation at high speed production and low cost.

Thus, in the presently used systems the speed of production of drip irrigation tubes is to be compensated against the requirement of minimal axial stretch. It is further difficult to manufacture the small-diameter tubes at high speeds and at desired orientation of molecular chains, because as the tube diameter decreases the surface drag increases and the rate of flow or passage decreases accordingly. In such case, the longitudinal stretch becomes unavoidable which further increases with the use of vacuum suction for increasing the speed of production.

Further, since the degree of radial orientation determines the tube stiffness to withstand the internal fluid pressure, more the axial orientation of tube, lesser will be the radial orientation and more will be the wall thickness of tube which is required to withstand a given internal pressure. Therefore, in light of the above described methods and systems of the prior art, where a considerable amount of longitudinal stretch (and thereby caused axial orientation) is unavoidable, unless partially compensated with the speed of production, more wall thickness is required to withstand the given internal pressure of fluid due to reduced radial orientation. This increased wall thickness results in extra consumption of raw material and thereby extra cost of production.

Even further, this also results in the non-uniformity and complexity in the production process.

In addition to the above, due to more thickness of the tube wall in the tubes produced in the prior art systems, biaxial stretching is required to be carried out at a considerable distance downstream of the calibrator. Therefore, it is required to have plurality of heating and cooling panels in succession to reheat the tube in order to obtain the desired stretching and/or thickness of the tube. Even further, usually the plastic tubing must be rotated in order to obtain some degree of uniform heating. Due to the foregoing provided drawbacks in the prior art, the amount of time necessary to get the plastic tubing to the required temperature is significantly high.

It is also known in the prior art to fabricate plastic tubes from a pliable plastic strip folded lengthwise. Two edges of the tape are overlapped and joined together to form a flat hollow tube. Subsequently, under pressure the tape opens out into a generally cylindrical form to provide a main conduit. Usually, the drip irrigation tape also includes a much smaller secondary conduit located along the seam formed by the overlapping edges of the plastic strip. The smaller conduit is connected to the main conduit to form a narrower passageway for the water flow, reducing the rate of flow of liquid. However, the method for making the films and sheets suffer from the abovementioned drawbacks.

There are methods for manufacturing drip irrigation tubes from films of with laminated bubble approach; for example, U.S. Pat. No. 5,591,293. Further, there are methods of manufacturing irrigation hoses from polymer beads using conventional extrusion nozzle; for example U.S. Pat. No. 4,642,152 (the Chapin method). However, these methods have certain limitations. The Chapin method, which employs conventional extrusion nozzle, is expensive and less efficient. Further, if the Chapin method is to be used for manufacturing tubes made up with two materials (one forming a main body and the other forming a pressure responsive/pressure-compensator membrane), then there are certain limitations. For instance, positioning the pressure-responsive membrane in the appropriate position is technically very difficult. If the positioning is not correct then the Chapin process does not render efficient and accurate results. Another drawback of the method is that it involves bonding of the flow path with the teeth; however, pressure compensation obtained by this method is comparatively less responsive. Further, the methods known in the prior art do not address the requirement of obtaining strength without adding stiffness. Thus, there is need for a process that allows fast production of drip irrigation tubes made up of two different materials, particularly including such tubes that are thin-walled and are with smaller diameters.

Accordingly, it is a principal object of the present invention to provide a method and apparatus for the high-speed production of drip irrigation tubes while still enabling to achieve the desired minimal or zero longitudinal stretch of tube, and thereby caused minimal or zero axial orientation of molecular chains. Particularly, it is the object of the present invention to provide a method and an apparatus for high speed production of thin-walled pressure-compensator-type drip irrigation tubes with smaller diameters having desired radian and axial orientation of its molecular chains.

It is an object of the present invention to present a method that allows optimum utilization of the Chapin process for producing pressure-compensator type drip irrigation tubes made from two different materials (one forming a main body and the other forming a pressure responsive/pressure-compensator membrane) by allowing correct positioning of the pressure-responsive membrane with respect to the main body of the tube. The correctness of the positioning is ensured by co-extruding the pressure-responsive membrane together and coincidental with the main body material and thereafter folding the membrane at an appropriate place.

Further objects and advantageous embodiments of the present invention are disclosed in the appended claims and the following description.

SUMMARY

A method for manufacturing of irrigation tubes, the method comprising, (a) extruding a tube using a plurality of extruders; (b) blowing up the extruded tube by introducing a pressure inside the tube relatively higher than the pressure outside the tube; (c) drawing the blown tube simultaneously to the blowing of tube; (d) flattening the blown tube by heat welding the collapsed halves together and forming a tape immediately subsequent to the process of blowing and drawing the tube; (e) extrusion of a bonding polymer on one border of the tape; (f) printing flow channels into the hot and viscous bonding polymer; and (g) forming a tube by lengthwise folding the tape and heat welding the overlapping borders together using the bonding polymer; characterized wherein the blowing of extruded tube confers the radial orientation to molecular chains and wherein the speed of simultaneously drawing the tape by sealing rollers is optionally altered to determine the axial orientation which may vary in range from absolute zero to an absolute maximum.

A production line for manufacturing the drip irrigation tubes, the line comprising: (a) a plurality of extruders for extruding the tube; (b) a means for inducing a pressure inside the tube relatively higher than the pressure outside the tube; (c) a means for drawing the blown tube simultaneously to the blowing of tube; (d) a means for flattening the blown tube by heat welding the collapsed halves together and forming a tape immediately subsequent to the process of blowing and drawing the tube; (e) means for extruding a bonding polymer on one border of the tape; (f) means for printing flow channels into the hot and viscous bonding polymer; (g) a means for forming a tube by lengthwise folding the tape and heat welding the overlapping borders together using the bonding polymer; characterized in that the blowing of extruded tube and drawing of the tape by sealing rollers is carried out simultaneously in order to enable the radial and axial orientation respectively wherein the speed of sealing rollers is altered optionally to determine the axial orientation which may vary in range from absolute zero to absolute maximum.

An irrigation tube to be used in drip irrigation systems, said tube comprising: (a) wall formed out of a lengthwise folded tape which may consist of one or more layers; (b) a bonding polymer between the overlapping parts of folded tape; and (c) flow channels formed into the bonding polymer, comprising a plurality of inlet openings, a flow restricting labyrinth and a plurality of outlet openings; characterized in that the molecular chains of the polymer are orientated in a radial direction and characterized in that the molecular chains of the polymer are not, or nearly not, orientated in the axial direction.

DETAILED DESCRIPTION OF THE INVENTION

Accordingly, it can be ascertained from the foregoing description that the there has been an unidentified need for the high speed production of irrigation tubes with desired mechanical properties. The present invention recognizes all the problems associated with existing designs and provides an improved system and method of producing drip irrigation tubes.

As mentioned above, it has been specifically observed by the present inventor(s) that configuration of absolute radial orientation of molecular chains (with minimal or zero axial orientation) is extremely advantageous for the purpose of irrigation tubes. It is found that with absolute radial orientation, the irrigation tube is highly stiff in radial direction in order to withstand the internal water pressure using a minimum amount of polymer. Also, in such radial orientation, the tube is elastic in axial direction in order to resist manipulation errors during the processing. Optionally, a combination of these effects at different extent desirable can be achieved by tailoring different material properties in different directions.

For example in case of polypropylene, stress at yield for an orientated film is five-fold higher than that for a non-oriented film; and elongation at break for an oriented film is 10 times lower than that for the non-oriented film. Thus, it would be beneficial to make drip irrigation tubes having molecular orientation in absolutely radial direction so that the tube will be in a radially oriented state in order to withstand high stress at yield and axially non-oriented state in order to confer high elongation at break. These properties are essentially beneficial in case of drip irrigation tubes manufactured at high speed. In addition to that, the present invention provides a method for production of such oriented tubes at high rates, which is certainly not possible with presently employed systems wherein with increasing speed of production, the longitudinal stretch (and thereby the axial orientation) is bound to occur.

FIGS. 1 to 5 broadly relate to illustration of the basic set up for achieving desired molecular orientation in the body of the tubes manufactured in accordance with the present invention. FIGS. 6 to 10 relate to structure of the tube so manufactured. FIG. 11 relates to the co-extrusion process, and FIG. 12 relates to the tool for accomplishing co-extrusion.

Figure 1:
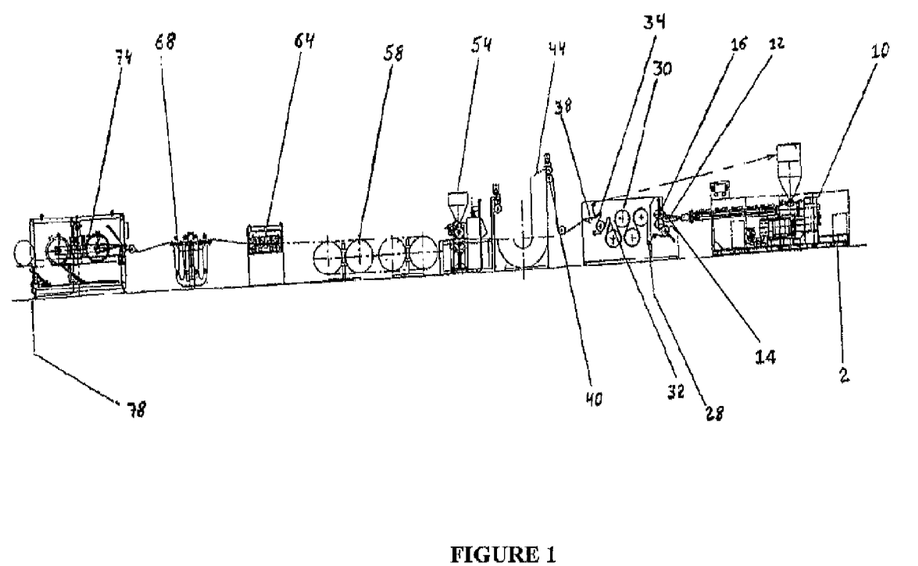
FIG. 1 shows the complete production line.
Figure 2:
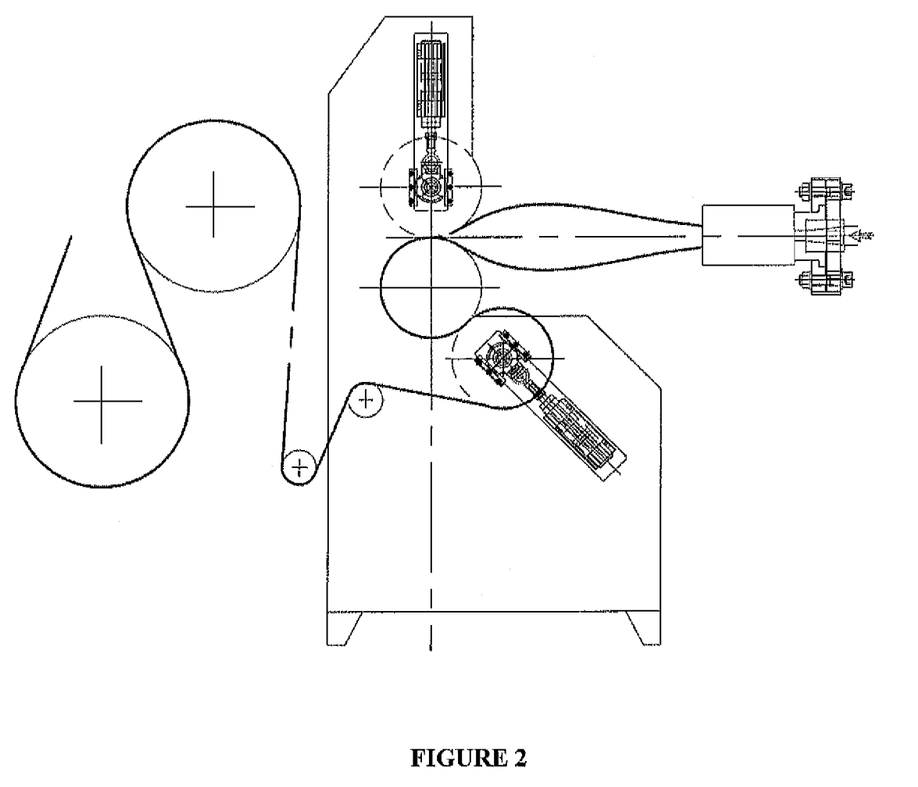
FIG. 2 represents the sectional view of the extruder profile of the production line.
Figure 3:
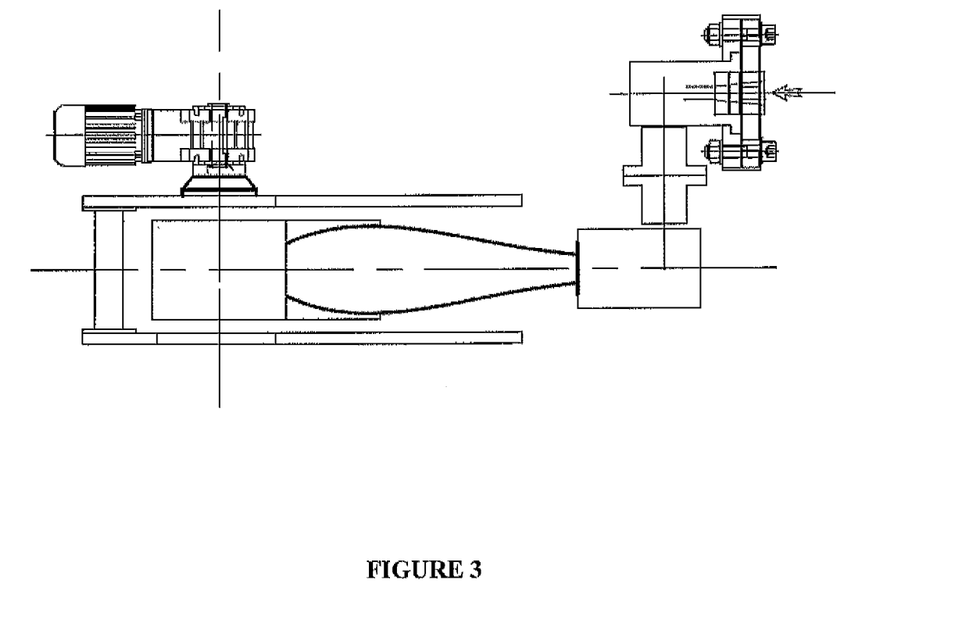
FIG. 3 represents the top view of the extruder profile of the production line.

In FIG. 1, the production line is provided which is constructed in accordance with the present invention employing a plurality of essential components. In this embodiment, the tube is shown as to be produced in a horizontal direction from right to left; of course, the tube can as well be produced in a vertical direction, as common in blown film production, either from down to up, or from up to down, both procedures being used and both having their advantages and drawbacks. The figure illustrates an extruder (10) including an extrusion head through which a tube is extruded having an outer diameter D. This tube usually consists of a single layer, but it can also be of several layers where of course more than one extruder is necessary. Downstream of the extruder, a pair of sealing rollers (14) has basically a twofold function—firstly their speed determines the longitudinal stretch subjected to the blown film; and secondly they flatten the extruded tube thus creating a closed volume inside the tube profile head (12). This volume is maintained at a pressure higher than the ambient pressure. The extruded tube blows up to a diameter which is preferably between 1.5 and 5 times the extruded diameter D. The pair of chilled rollers (30) further flatten the tube and heat weld the two halves together. On its short way from the extrusion head to the rollers, the outer surface of the tube is cooled slightly in the pre-cooling calendar (16); wherein the inner surface of the tube is essentially maintained at extrusion temperature, in order to facilitate the heat welding of the two halves of the flattened tube. The passage through the two rollers assures a uniform thickness of the resulting tape. Alternatively, the rollers can be profiled producing a tape with a non-constant thickness (e.g. thinner on the peripheral parts to be overlapped). After cooling of the tape, it is brought down to a desired temperature, well below extrusion temperature. If necessary, the tape is brought to a precise width by cutting away stripes on one or both borders at the trimming station (34). The profiled tape is measured and accumulated, if necessary. In the following steps, the tape is formed to a drip irrigation pipe with overlapping parts containing water flow channels. This process of making drip irrigation hose out of an elongated flat strip of flexible material involves folding lengthwise of the manufactured tube.

The method of producing an irrigation tube having radially orientated molecular chains is best explained by following a production line assembled in accordance with the present invention. The present invention incorporates the blowing of the tube just after the extrusion of molten plastic from the extruder. Blowing up the tube means that the tube is stretched in a radial direction and thereby imparts an orientation to molecular chains in the same direction. At the same time, the advance speed of the tube, imposed by the speed of the sealing rollers (14), is chosen in a way, that there is minimal or no stretching in the longitudinal direction and consequently no molecular orientation in the axial direction. It is found by the present inventor(s) that this process of simultaneously blowing the tube and drawing the tube at appropriate speed just after the extrusion, with immediate subsequent flattening not only avoids the use of any calibrator but also enables achieving the desired radial orientation at virtually very high speed without any limitation. Subsequent to the radial blowing, and the longitudinal stretching, required if any, the flattening of the tube is carried out by the set of sealing rollers itself. In accordance with the present invention, the speed of rollers can be set in a manner that the extruded tube is subjected to minimal or zero longitudinal stretch. Preferably, the speed of sealing rollers is equal to the speed of extrusion of the tube in order to achieve the minimal or zero longitudinal stretch. However, there are some rare applications possible where a higher stress at yield and the associated lower elongation at break are as well desirable in the axial direction. In such case the required axial orientation in the final product can easily be achieved in accordance with the present invention by simply increasing the speed of the rollers to confer a relative longitudinal stretch and the axial orientation. Thus, the axial orientation of the tube can be varied by merely changing the speed of the sealing rollers downstream of the radially blown tube. This way, any degree of orientation can be obtained by adjusting the diameter ratio between the extruded tube and the blown-up tube on one side and the draw speed imposed by sealing rollers on the other side. During its passage through the rollers, the tube is pressed to make the sheet of bi-axially stretched tape.

After the manufacture of flat tape or sheet of desired orientation and thickness, the following steps include the formation of drip irrigation pipe by lengthwise folding the sheet wherein the overlapping parts containing water flow channels. For these subsequent steps of fabricating the tube from sheet, there are several methods available in the prior art with their respective advantages and disadvantages, which can be employed for the present invention.

In one of the preferred embodiment, the following method can be used:

In a known way, a polymer layer is extruded near to one of the borders of the tape using an extruder and an application head. The following embossing wheel prints the flow restricting labyrinth and the channels for water inlet and water outlet into the extruded polymer layer. In an already known manner the tape is formed to a tube with overlapping parts. These parts, containing the polymer with embossed channels, are heat welded together to form the tube.

In FIG. 1 the ready irrigation tube is cooled in a cooling trough (30) and normally spooled on a bobbin (44). Equally known is a slightly different procedure where the flow channels are printed into one border of the tape, wherein the extruder is no longer necessary; and the two borders of the tape are heat welded together without an additional polymer layer.

The drip irrigation tube according to the invention is a tube obtained by folding an elongated tape (strip) into a tube. The forming is done in a way that the borders of the tape overlap when formed to the tube. The overlapping part is filled with a bonding polymer which contains the flow channels composed of an inlet opening, a flow restricting labyrinth and an outlet opening.

Figure 4:
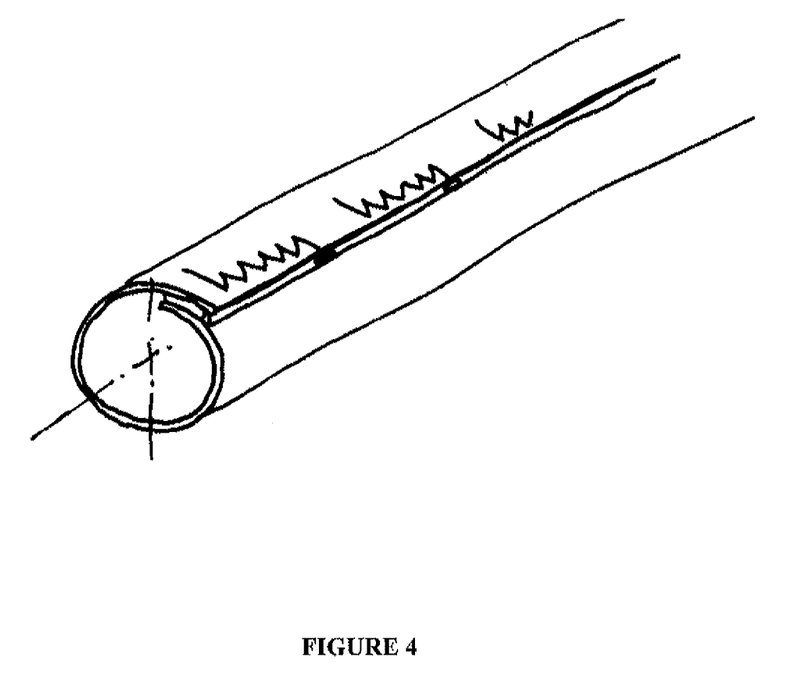
FIG. 4 illustrates the irrigation tube formed from the carved sheet.
Figure 5:
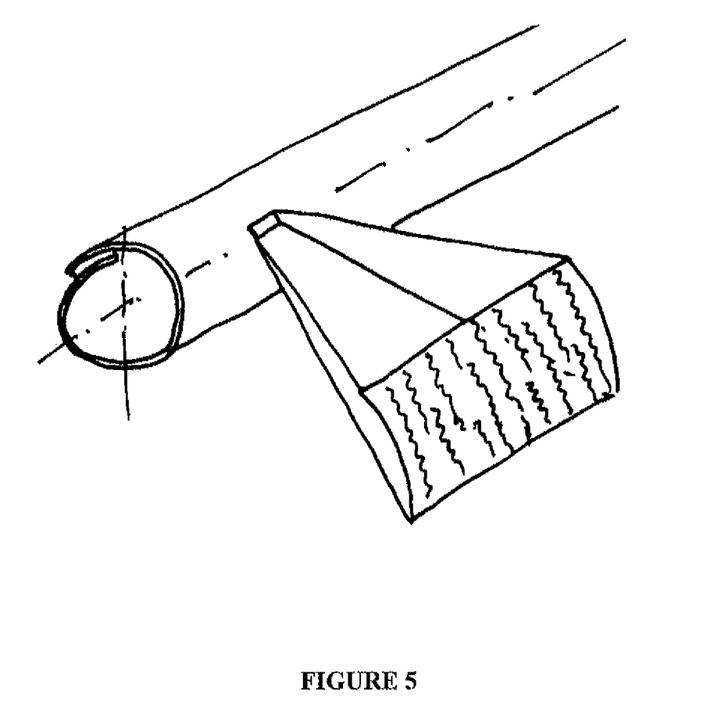
FIG. 5 illustrates the orientation of molecular chains in the formed tube.

FIG. 4 illustrates a typical realization of this type of irrigation tube. The particularity of the tube according to the invention is that the threadlike molecular chains of the polymer from which it is extruded are orientated in the direction perpendicular to the lengthwise extent of the tube, as illustrated in FIG. 5.

On a given sample, the orientation of the molecular chains is not easy to detect as sophisticated tools are necessary for doing this. On the contrary, it is easy to measure mechanical properties as stress at yield and elongation (strain) at break. The tube according to the invention shows a high elongation at break and a low stress at yield in the axial direction and a low elongation at break together with a high stress at yield in the radial direction.

For FIGS. 6 to 10 following is the numbering scheme:
(1) main body
(2) pressure responsive membrane
(3) slit inlet
(4) slit outlet
(5) chevrons (teeth)
(6) side rails
(7) crossover FIGS. 6 to 10 relate to structure of the tube so manufactured.

Figure 6:
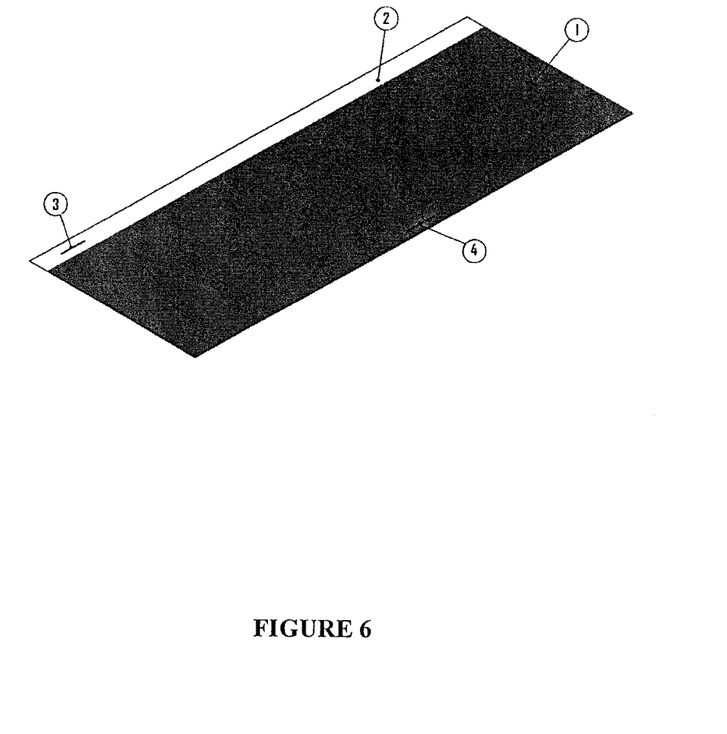
FIG. 6 illustrates the film for pressure compensator type tube, the film comprising two parts—the main body, and a pressure responsive membrane attached to the main body.
Figure 7:
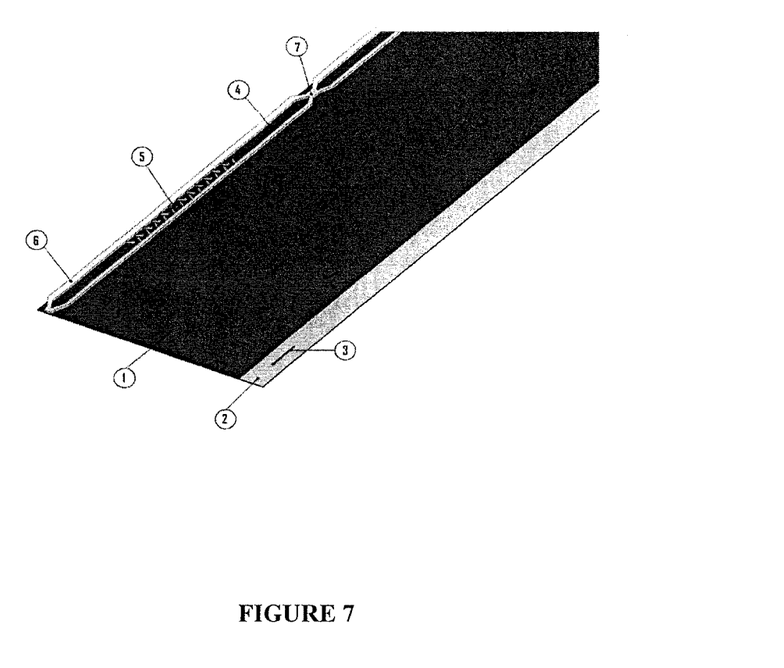
FIG. 7 illustrates the sheet comprising pressure-responsive membrane and flow path for water, from which drip irrigation tube is made.
Figure 12:
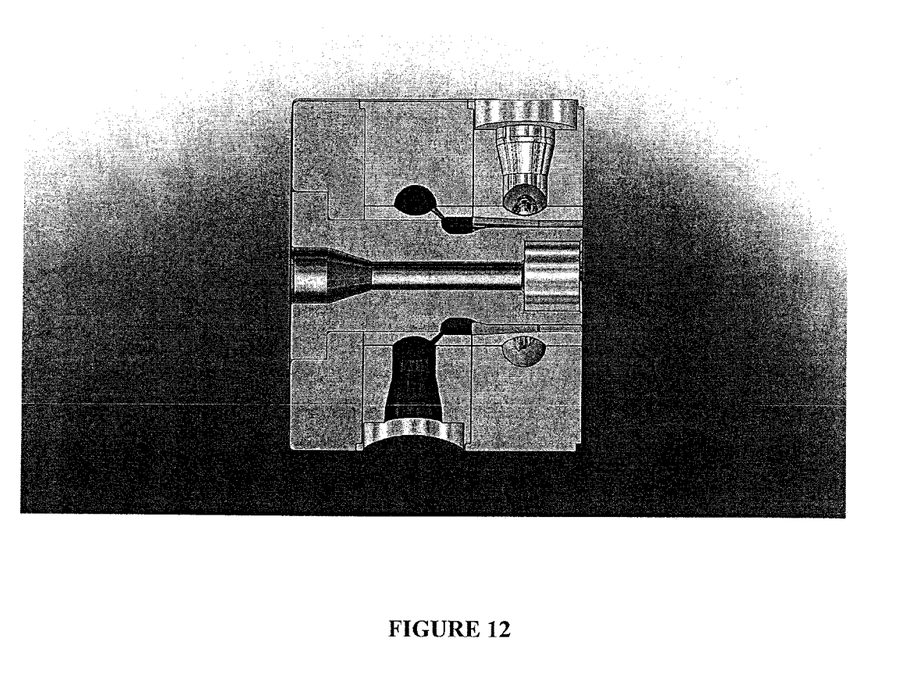
FIG. 12 illustrates the tool for feeding two different materials (for the main body and for the pressure-responsive tape) for co-extrusion.

To accomplish pressure compensation first a film having a section of the film (2) somewhat thinner than the main body of the film (1) is to be formed. The slit indicated in (3) is formed after the film is made. The resultant film will appear as shown in FIG. 6. The section (2) that is thinner than the main body of the film will be ultimately formed to be the pressure responsive area. This type of film formation can also be accomplished using co extrusion in which the thinner or responsive section (2) can be made of a more elastic material such as a polyethylene elastomer, so that compatible co extrusion can exist. FIG. 12 shows the process of co-extrusion and bubble formation. This enhances the final formed product's response to pressure variations. FIG. 6 depicts the film with the slit inlets (3) and outlets (4) that are formed after the film is made.

The film is then run through a roller that contains blades that form the slits for the outlet and inlets at the time. These slits are formed to be coincident with the flow path of water.

Figure 8:
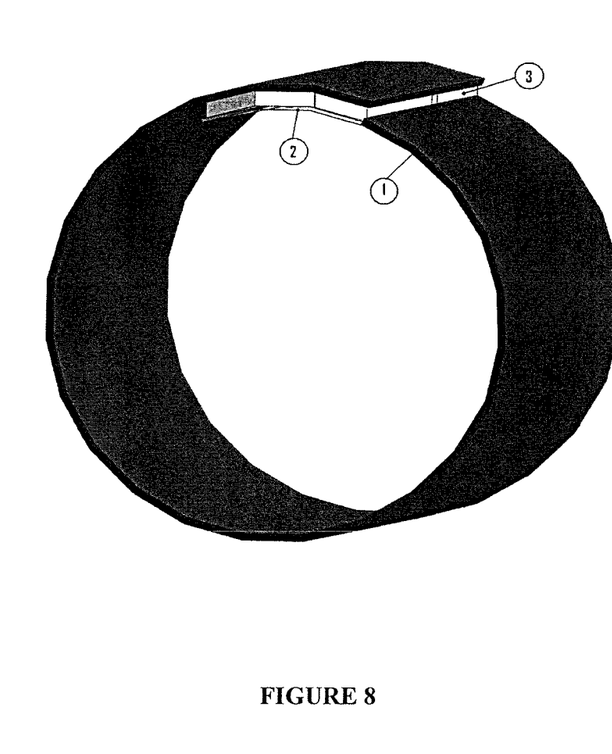
FIGS. 8, 9 and 10 illustrate folding of the sheet illustrated in FIG. 7, specifying arrangement of the flow path area for water and the pressure-responsive membrane with respect to each other.
Figure 9:
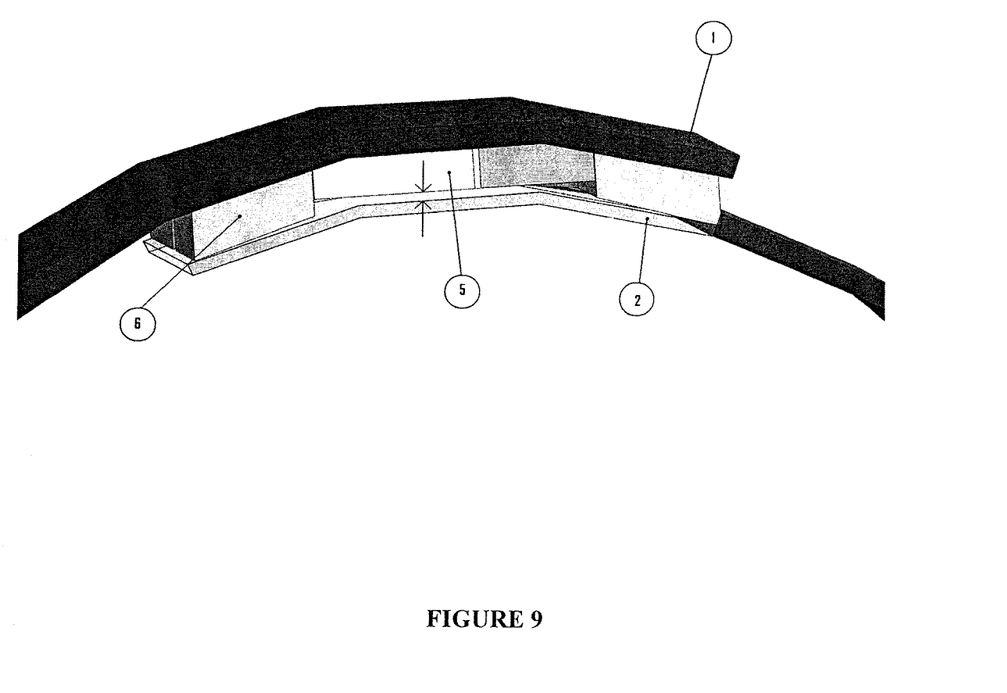
Figure 10:
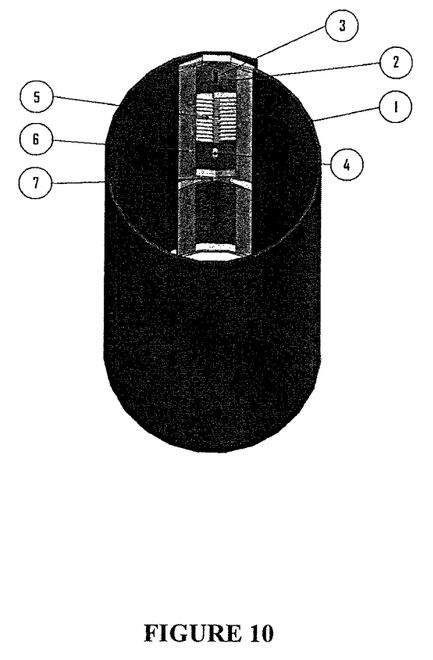
Figure 11:
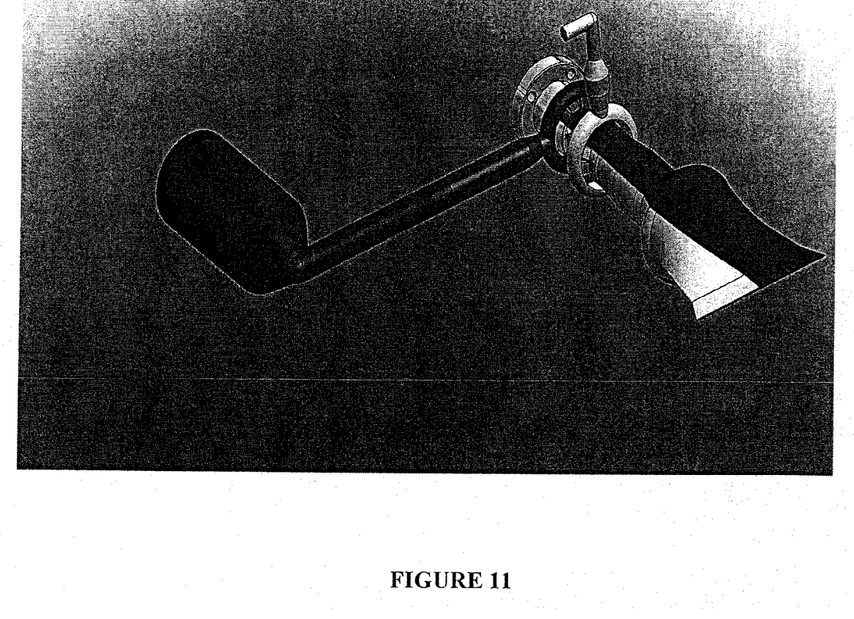
FIG. 11 illustrates co-extrusion and bubble formation.

Once this film (1) is formed it is then run through a series of rollers that form a tube with the thinner portion (2) being overlapped to the inside of the formed tube as shown in FIGS. 8, 9 and 10. The film is then pre-folded into its final configuration and just prior to the seaming the flow track (5,6, & 7) is formed by a rotary wheel on the upper or thicker portion of the web directly below the thinner portion (2) that is to be overlapped and sealed. In one case the teeth of the chevrons (5) that form the flow path do not touch the adjacent film so as to provide a varying length of the flow path that compensates for pressure. In another method the teeth may be sufficiently spaced to narrow the flow path upon pressure changes. There is a crossover (7) to separate each emitter in the continuous path and side rails (6) to separate and seal the emitter in the channel.

A final method of tape manufacture would be to have the flow path embossed into the nip wheel on the roll stack and then when the compression of the bubble onto the roll occurs it would simultaneously be compressed into the embossment creating an emitter. The outlet and inlet could be formed by a slit and the containing rails could be heat sealed together. A thin section of pressure compensation could also be incorporated into this design as well.

FIG. 11 shows the process of co-extrusion. As illustrated, material for the main body is moved from a main extruder in to a distribution ring for the main body. From the distribution ring the material is moved further to the compression zone. Parallelly, material for the pressure-responsive membrane is moved to another distribution ring, and from there to the compression zone. The two materials are heat sealed as they approach the compression zone. At the compression zone air is injected into the composite material, which blows the composite material, and thereby forms bubble. This blown material is further processed as illustrated in FIG. 1.

FIG. 12 shows vertical cross section of the tool for feeding the two materials (material for the main body of the pipe and material for the pressure-responsive membrane). As shown, the tool comprises two hollow slots for containing the two materials. From the respective slot the respective material is fed to the co-extruder as illustrated in FIG. 11.

We claim:

1. A method for manufacturing pressure compensator-type drip irrigation tubes at high speed comprising:
    a. extruding a polymer tube using a plurality of extruders;
    b. blowing up the extruded tube by inducing a pressure inside the tube;
    c. drawing the blown tube simultaneously to the blowing of tube, wherein an advance speed of the drawing of the tube is imposed by a speed of a sealing roller selected in a way that there is no minimal, or no stretching in a longitudinal direction and consequently no molecular orientation in an axial direction;
    d. flattening the blown tube by heat welding collapsed halves of the tube together using a pair of chilled rollers and forming a tape immediately subsequent to the process of blowing and drawing the tube;
    e. extrusion of a bonding polymer on one border of the tape;
    f. printing flow channels into the hot and viscous bonding polymer; and
    g. forming a tube by lengthwise folding the tape and heat welding the overlapping borders together using the bonding polymer;
    wherein simultaneous blowing and drawing of the extruded tube whereby confers radial orientation to molecular chains.

2. The method as claimed in claim 1, wherein the speed of sealing rollers is equal to the speed of extrusion of the tube.

3. The method as claimed in claim 1, wherein inner surface of the tube is maintained at extruded temperature.

4. The method as claimed in claim 1, wherein further flattening of the tube is carried out by a set of chilled rollers.

5. The method as claimed in claim 1, wherein a polymer layer is extruded near to one of the borders of the tape using an extruder.

6. A method for accomplishing pressure compensation comprising:
    i. formation of a section of film thinner than a main body of the film; wherein formation of the section of film is accomplished using coextrusion;
    ii. formation of a slit inlet and outlet by running through a roller that contains blades; and
    ii. section formed in (a) is ultimately formed to be the pressure responsive area;
    wherein process of co-extrusion comprises:
    a. material for the main body is moved from a main extruder into a distribution ring for the main body;
    b. from the distribution ring the material is moved further to the compression zone;
    c. simultaneously, material for the pressure-responsive membrane is moved to another distribution ring and from there to the compression zone;
    d. the two materials are heat sealed as they approach the compression zone; and
    e. at the compression zone air is injected into the composite material, which blows the composite material, and thereby forms bubble.

7. A production line for manufacturing pressure compensator-type drip irrigation tubes at high speed, the line comprising:
    a. plurality, of extruders for extruding a polymer;
    b. a means for inducing a pressure inside the tube;
    c. a means for drawing the blown tube simultaneously to the blowing of tube;
    d. a means for flattening the blown tube by heat welding the collapsed halves together and forming a tape immediately, subsequent to the process of blowing and drawing the tube;
    e. a means for extruding a bonding polymer on one border of the tape;
    f. a means for printing flow channels into the hot and viscous bonding polymer;
    g. a means for forming a tube by lengthwise folding the tape and heat welding the overlapping borders together using the bonding polymer; and
    h. a tool for feeding the material for the main body and material for the pressure-responsive membrane for co-extrusion comprising two hollow slots for containing the said two materials.

8. The method as claimed in claim 1, wherein pressure induced inside the tube is higher than pressure outside the tube.

9. The method as claimed in claim 1, wherein a diameter of the blown tube is between 1.5 to 5 times of an extruded diameter.

10. The method as claimed in claim 1, wherein simultaneous blowing and drawing of the tube thereby confers radial orientation to a molecular chains.

11. The method as claimed in claim 1, wherein advance speed of drawing is optionally altered to determine axial orientation, varying in range from absolute zero to absolute maximum.

12. The method as claimed in claim 6, wherein the film formation is accomplished using co-extrusion in which the responsive section is made of an elastic material such as polyethylene elastomer, so that compatible co-extrusion exists.

* * * * *

UNITED STATES PATENT AND TRADEMARK OFFICE
CERTIFICATE OF CORRECTION

Page 1 of 1

PATENT NO. : 9,027,856 B2
APPLICATION NO. : 13/342549
DATED : May 12, 2015
INVENTOR(S) : Michael P. DeFrank et al.

It is certified that error appears in the above-identified patent and that said Letters Patent is hereby corrected as shown below:

In the Claims

In column 9, line 41 (claim 1), "extruded tube whereby" should read -- extruded tube thereby --

In column 10, line 1 (claim 6), "ii. section formed in (a)" should read -- iii. section formed in (a) --

In column 10, line 47 (claim 10), "to a molecular chains" should read -- to a molecular chain --

Signed and Sealed this
Eighth Day of September, 2015

Michelle K. Lee
*Director of the United States Patent and Trademark Office*